United States Patent
Yamamoto et al.

(10) Patent No.: US 11,180,084 B2
(45) Date of Patent: Nov. 23, 2021

(54) VEHICLE PERIPHERY DISPLAY DEVICE

(71) Applicant: AISIN SEIKI KABUSHIKI KAISHA, Kariya (JP)

(72) Inventors: Kinji Yamamoto, Kariya (JP); Kazuya Watanabe, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/929,462

(22) Filed: Jul. 15, 2020

(65) Prior Publication Data
US 2021/0016712 A1    Jan. 21, 2021

(30) Foreign Application Priority Data
Jul. 16, 2019    (JP) .............................. JP2019-131406

(51) Int. Cl.
*B60R 1/00*    (2006.01)
*B62D 15/02*    (2006.01)

(52) U.S. Cl.
CPC ............ *B60R 1/002* (2013.01); *B62D 15/029* (2013.01); *B60R 2300/10* (2013.01); *B60R 2300/302* (2013.01); *B60R 2300/70* (2013.01)

(58) Field of Classification Search
CPC .............. B60R 1/002; B60R 2300/302; B60R 2300/10; B60R 2300/70; B60R 2300/806; B60R 2300/607; B60R 2300/305; B60R 1/00; B60R 2300/804; B60R 2300/8093; B62D 15/029; B62D 15/0275
See application file for complete search history.

(56) References Cited

U.S. PATENT DOCUMENTS

| | | | |
|---|---|---|---|
| 2002/0110262 A1* | 8/2002 | Iida ..................... | B62D 15/0295 382/104 |
| 2010/0066833 A1* | 3/2010 | Ohshima .................. | B60R 1/00 348/148 |
| 2016/0088260 A1* | 3/2016 | Fujio ...................... | H04N 7/181 348/148 |
| 2017/0054973 A1* | 2/2017 | Kasazumi .......... | G02B 27/0101 |
| 2018/0281681 A1* | 10/2018 | Sunohara ................. | H04N 7/18 |

FOREIGN PATENT DOCUMENTS

| | | |
|---|---|---|
| JP | 3807330 B2 | 8/2006 |
| JP | 3894322 B2 | 3/2007 |
| JP | 5182137 B2 | 4/2013 |
| JP | 5605606 B2 | 10/2014 |

* cited by examiner

*Primary Examiner* — James M Pontius
(74) *Attorney, Agent, or Firm* — Sughrue Mion, PLLC

(57) ABSTRACT

A vehicle periphery display device includes: an acquisition portion acquiring a captured image obtained by imaging a periphery of a vehicle with an imaging portion; and a display processing portion causing a display image that is a stereoscopic image of the vehicle and the periphery of the vehicle to be displayed on a display portion on the basis of the captured image. The display processing portion causes at least one of a contour guide line representing a contour of the vehicle, and a predicted course guide line that is a trajectory drawn by the contour guide line according to movement of the vehicle to be included in the display image, and changes a position of at least one of the contour guide and predicted course guide lines such that the contour guide and predicted course guide lines are present above a road surface when the vehicle is turned.

13 Claims, 9 Drawing Sheets

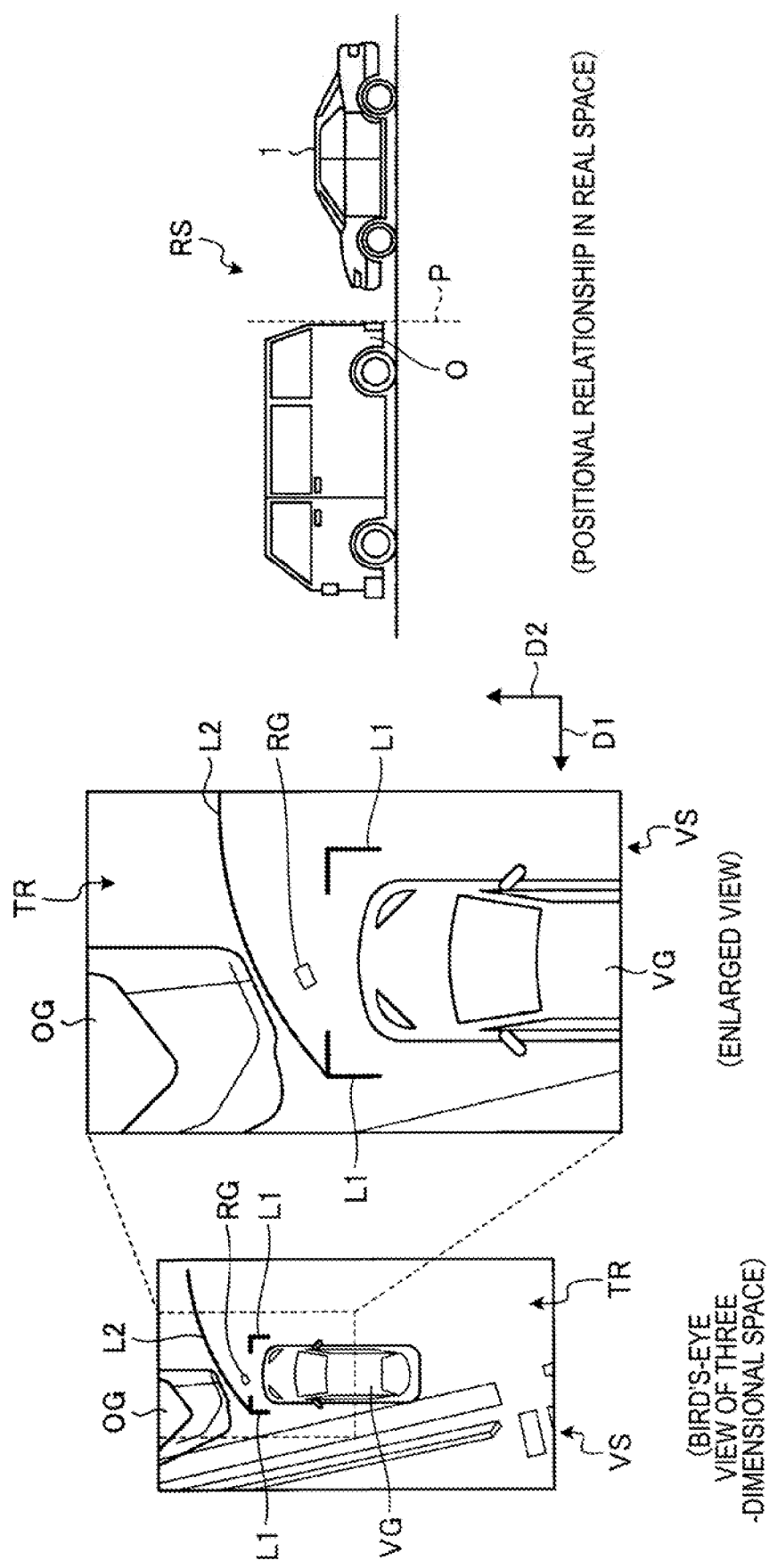

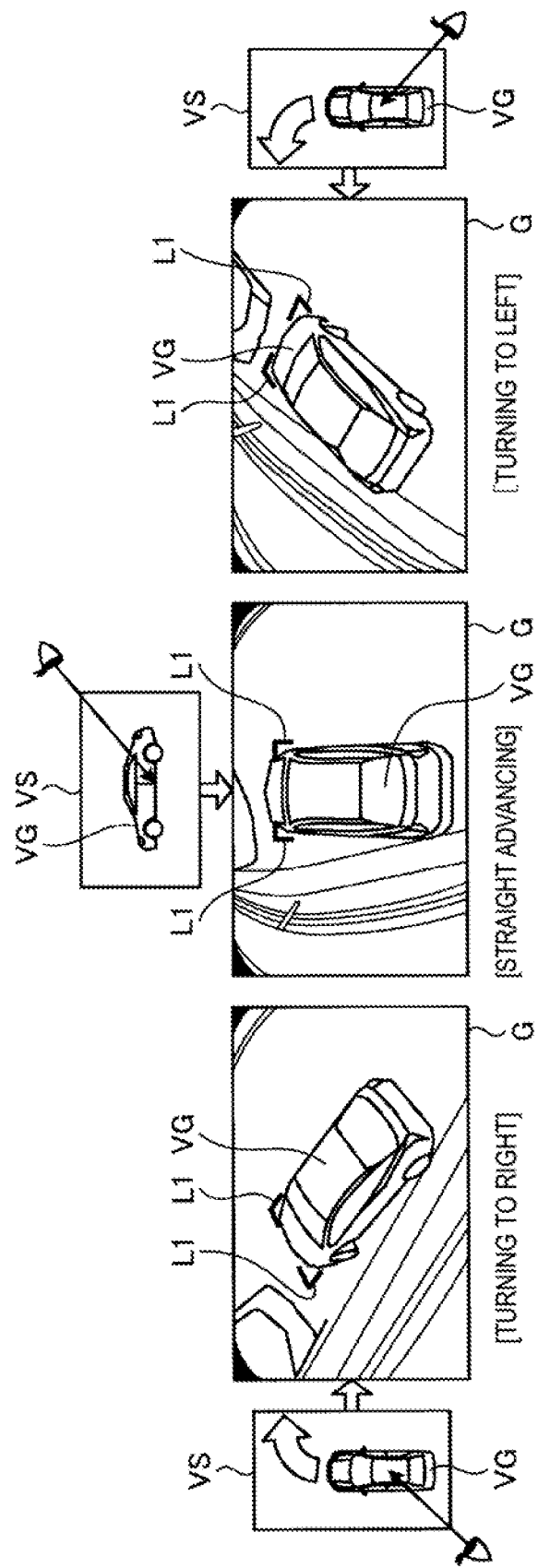

FIG.9
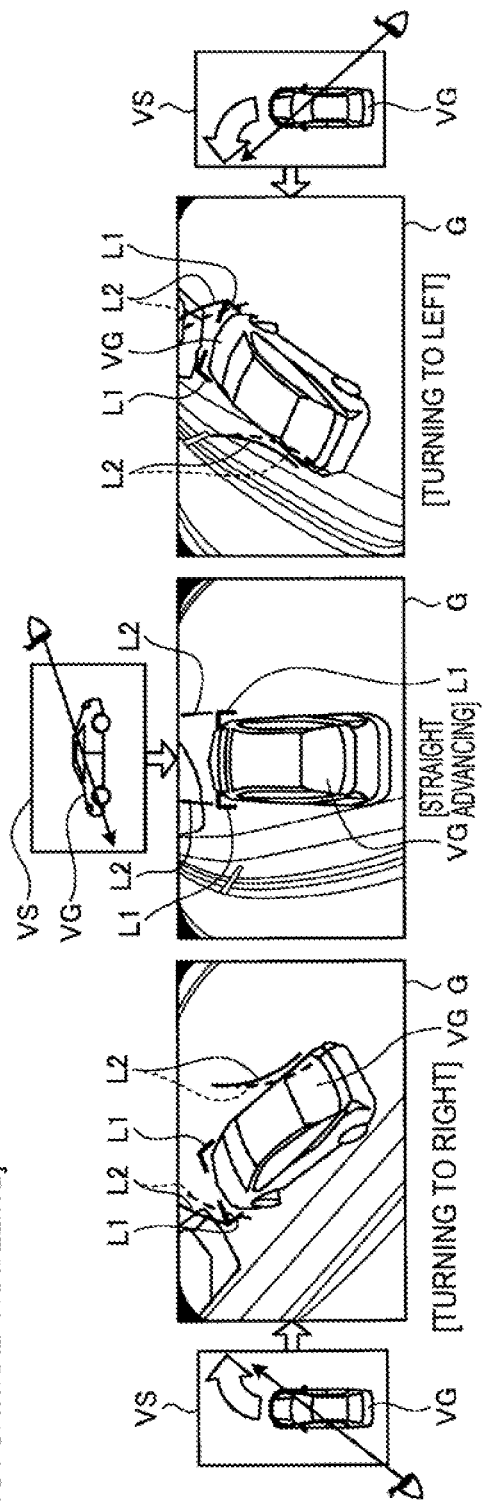
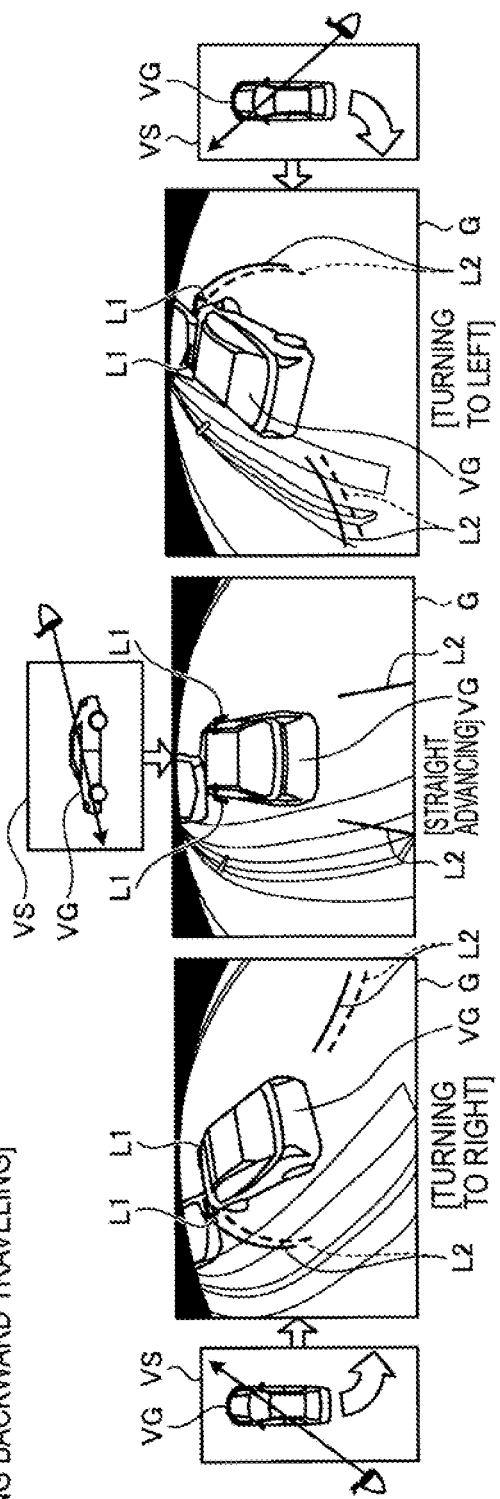

VEHICLE PERIPHERY DISPLAY DEVICE

CROSS REFERENCE TO RELATED APPLICATIONS

This application is based on and claims priority under 35 U.S.C. § 119 to Japanese Patent Application 2019-131406, filed on Jul. 16, 2019, the entire content of which is incorporated herein by reference.

TECHNICAL FIELD

Embodiments of this disclosure relate to a vehicle periphery display device.

BACKGROUND DISCUSSION

A technique has been developed in which, when a stereoscopic image of a vehicle and the periphery thereof is displayed as a display image is displayed on a display portion on the basis of captured images obtained by imaging the vehicle and the periphery thereof with an imaging portion, the display image includes a contour guide line representing a contour of the vehicle, and a predicted course guide line that is a trajectory drawn by an end of the contour guide line according to movement of the vehicle.

However, in the above technique, since the contour guide line is displayed at a fixed position with respect to a position of an image of the vehicle in the display image, in a case where an image of an object (obstacle) floating from a road surface is included in the display image, there is a probability that an occupant who sees the display image may misunderstand a distance from the vehicle to the object, and thus the vehicle may collide with the object.

A need thus exists for a vehicle periphery display device which is not susceptible to the drawback mentioned above.

SUMMARY

A vehicle periphery display device according to an embodiment includes, as an example, an acquisition portion that acquires a captured image obtained by imaging a periphery of a vehicle with an imaging portion; and a display processing portion that causes a display image that is a stereoscopic image of the vehicle and the periphery of the vehicle to be displayed on a display portion on the basis of the captured image, in which the display processing portion causes at least one of a contour guide line representing a contour of the vehicle, and a predicted course guide line that is a trajectory drawn by the contour guide line according to movement of the vehicle to be included in the display image, and changes a position of at least one of the contour guide line and the predicted course guide line such that the contour guide line and the predicted course guide line are present above a road surface in a case where the vehicle is turned.

BRIEF DESCRIPTION OF THE DRAWINGS

The foregoing and additional features and characteristics of this disclosure will become more apparent from the following detailed description considered with the reference to the accompanying drawings, wherein:

FIG. 6 is a diagram for describing an example of a process in which a contour guide line and a predicted course guide line are drawn in a three-dimensional space by the vehicle periphery display device of the vehicle according to the first embodiment;

FIG. 8 is a diagram for describing an example of a process in which a display image is displayed by a vehicle periphery display device of a vehicle according to a second embodiment;

FIG. 9 is a diagram for describing another example of a process in which a display image is displayed by the vehicle periphery display device of the vehicle according to the second embodiment.

DETAILED DESCRIPTION

Hereinafter, exemplary embodiments disclosed here will be described. The configurations of the embodiments described below and the operations, results, and effects provided by the configurations are examples. The present disclosure can be realized by configurations other than those disclosed in the following embodiments, and can achieve at least one of various effects based on the fundamental configuration and derivative effects.

First Embodiment

Figure 1:
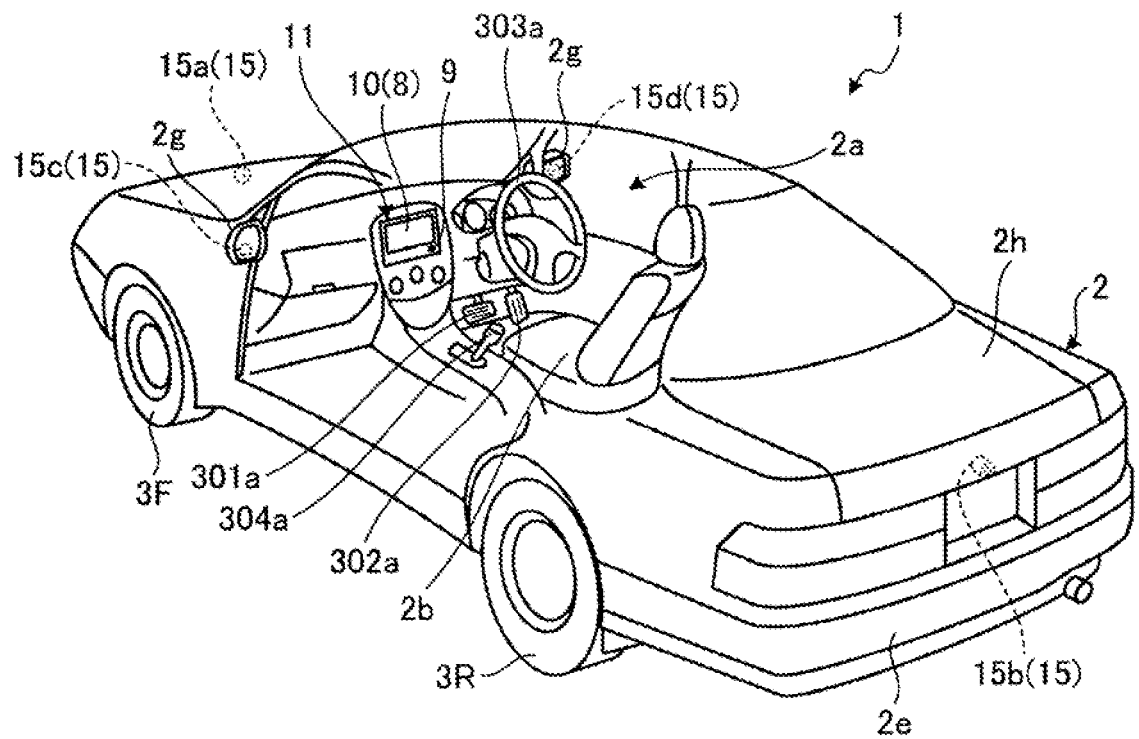
FIG. 1 is an exemplary and schematic diagram illustrating a configuration of a vehicle cabin of a vehicle according to a first embodiment.
Figure 2:
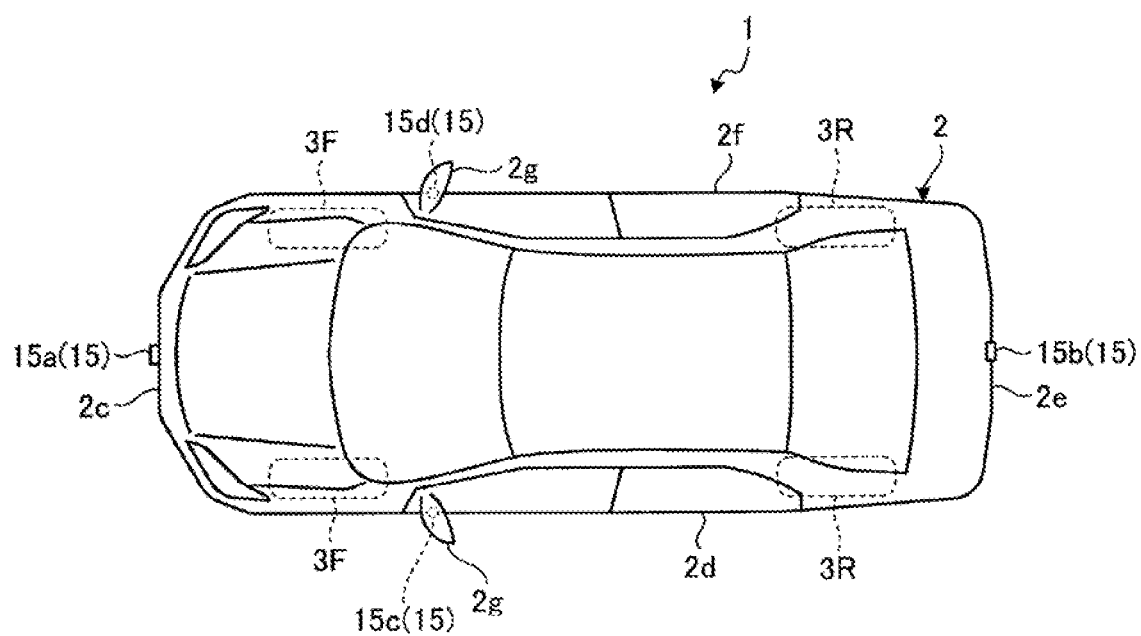
FIG. 2 is an exemplary and schematic view illustrating an appearance of the vehicle according to the first embodiment, viewed from above.

FIG. 1 is an exemplary and schematic diagram illustrating a configuration of a vehicle cabin of a vehicle according to a first embodiment. FIG. 2 is an exemplary and schematic view illustrating an appearance of the vehicle according to the first embodiment, viewed from above.

First, an example of a hardware configuration of a vehicle to which a vehicle periphery display device according to the present embodiment is applied will be described with reference to FIGS. 1 and 2.

As illustrated in FIG. 1, a vehicle 1 according to the present embodiment has a vehicle cabin 2a in which occupants including a driver as a user gets. In the vehicle cabin 2a, a braking portion (braking operation portion) 301a, an acceleration portion (acceleration operation portion) 302a, a steering portion 303a, a shift portion (shift operation portion) 304a, and the like are provided to be operable by the user from a seat 2b.

The braking portion 301a is, for example, a brake pedal provided under the drivers foot. The acceleration portion 302a is, for example, an accelerator pedal provided under the drivers foot. The steering portion 303a is, for example, a steering wheel protruding from a dashboard (instrument panel). The steering portion 303a may be a handle. The shift portion 304a is, for example, a shift lever protruding from the center console.

A monitor device 11 having a display portion 8 capable of outputting various images and a sound output portion 9 capable of outputting various sounds is provided in the vehicle cabin 2a. The monitor device 11 is provided, for example, in the central portion in the width direction (left-right direction) of the dashboard in the vehicle cabin 2a. The display portion 8 is, for example, a liquid crystal display (LCD) or an organic electroluminescence display (OELD).

An operation input portion 10 is provided on a display screen as a region in which an image is displayed on the display portion 8. The operation input portion 10 is, for example, a touch panel capable of detecting coordinates of a position where a pointer such as a finger or a stylus approaches (including contact). Consequently, the user (driver) can visually recognize an image displayed on the display screen of the display portion 8 and perform a touch (tap) operation or the like using the indicator on the operation input portion 10, to execute various operation inputs.

In the present embodiment, the operation input portion 10 may be various physical interfaces such as switches, dials, joysticks, and push buttons. In the present embodiment, another sound output device may be provided at a position different from the position of the monitor device 11 in the vehicle cabin 2a. In this case, various pieces of sound information may be output from both of the sound output portion 9 and another sound output device. In the present embodiment, the monitor device 11 may be configured to be able to display information regarding various systems such as a navigation system and an audio system.

As illustrated in FIGS. 1 and 2, the vehicle 1 according to the present embodiment is configured with a four-wheeled vehicle having two front vehicle wheels 3F on the left and right and two rear vehicle wheels 3R on the left and right. Hereinafter, for simplification, the front vehicle wheels 3F and the rear vehicle wheels 3R may be collectively referred to as vehicle wheels 3. In the embodiment, sideslip angles of some or all of the four vehicle wheels are changed (turned) according to an operation on the steering portion 303a.

The vehicle 1 is equipped with a plurality of (four in the example illustrated in FIGS. 1 and 2) in-vehicle cameras 15a to 15d as imaging portions for monitoring the periphery. The in-vehicle camera 15a is provided at a rear end 2e of a vehicle body 2 (for example, below a rear trunk door 2h), and images a rearward region of the vehicle 1. The in-vehicle camera 15b is provided on a side-view mirror 2g at a right end 2f of the vehicle body 2, and images a rightward region of the vehicle 1. The in-vehicle camera 15c is provided at a front end 2c (for example, a front bumper) of the vehicle body 2, and images a frontward region of the vehicle 1. The in-vehicle camera 15d is provided on a side-view mirror 2g at a left end 2d of the vehicle body 2, and images a leftward region of the vehicle 1. Hereinafter, for simplification, the in-vehicle cameras 15a to 15d will be collectively referred to as the in-vehicle camera 15 in some cases.

The in-vehicle camera 15 is a so-called digital camera having an imaging element such as a charge coupled device (CCD) or a complementary metal oxide semiconductor (CMOS) image sensor. The in-vehicle camera 15 images the surroundings (periphery) of the vehicle 1 at a predetermined frame rate, and outputs image data of a captured image obtained through the imaging. The image data obtained by the in-vehicle camera 15 may form a moving image as a frame image.

Figure 3:
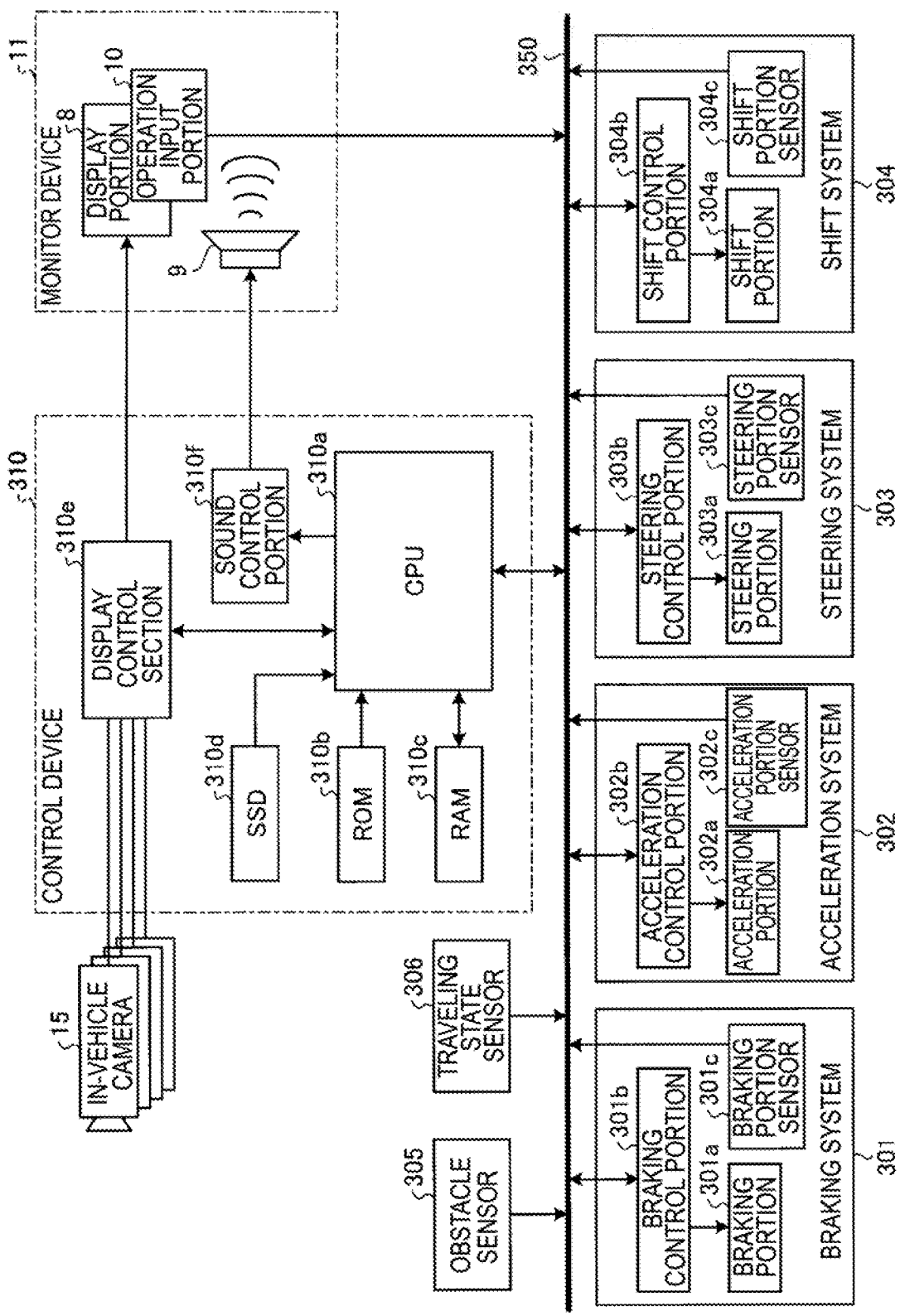
FIG. 3 is an exemplary and schematic block diagram illustrating a system configuration of the vehicle according to the first embodiment.

FIG. 3 is an exemplary and schematic block diagram illustrating the system configuration of the vehicle according to the first embodiment.

Next, with reference to FIG. 3, a system configuration provided for realizing various types of control in the vehicle 1 according to the embodiment will be described. The system configuration illustrated in FIG. 3 is only an example, and may be variously set (changed).

As illustrated in FIG. 3, the vehicle 1 according to the present embodiment includes a braking system 301, an acceleration system 302, a steering system 303, a shift system 304, an obstacle sensor 305, and a traveling state sensor 306, the in-vehicle camera 15, the monitor device 11, a control device 310, and an in-vehicle network 350.

The braking system 301 controls deceleration of the vehicle 1. The braking system 301 includes the braking portion 301a, a braking control portion 301b, and a braking portion sensor 301c.

The braking portion 301a is a device for decelerating the vehicle 1, such as the above-described brake pedal.

The braking control portion 301b is, for example, a microcomputer having a hardware processor such as a central processing unit (CPU). The braking control portion 301b controls, for example, the extent of deceleration of the vehicle 1 by driving an actuator (not illustrated) and operating the braking portion 301a on the basis of an instruction that is input via the in-vehicle network 350.

The braking portion sensor 301c is a sensing device that detects a state of the braking portion 301a. For example, in a case where the braking portion 301a is configured with a brake pedal, the braking portion sensor 301c detects a position of the brake pedal or the pressure acting on the brake pedal as a state of the braking portion 301a. The braking portion sensor 301c outputs the detected state of the braking portion 301a to the in-vehicle network 350.

The acceleration system 302 controls acceleration of the vehicle 1. The acceleration system 302 has the acceleration portion 302a, an acceleration control portion 302b, and an acceleration portion sensor 302c.

The acceleration portion 302a is a device for accelerating the vehicle 1, such as the accelerator pedal described above.

The acceleration control portion 302b is configured with, for example, a microcomputer having a hardware processor such as a CPU. The acceleration control portion 302b controls, for example, the extent of acceleration of the vehicle 1 by driving an actuator (not illustrated) and operating the acceleration portion 302a on the basis of an instruction that is input via the in-vehicle network 350.

The acceleration portion sensor 302c is a sensing device that detects a state of the acceleration portion 302a. For example, in a case where the acceleration portion 302a is configured with an accelerator pedal, the acceleration portion sensor 302c detects a position of the accelerator pedal or the pressure acting on the accelerator pedal. The acceleration portion sensor 302c outputs the detected state of the acceleration portion 302a to the in-vehicle network 350.

The steering system 303 controls an advancing direction of the vehicle 1. The steering system 303 includes the steering portion 303a, a steering control portion 303b, and a steering portion sensor 303c.

The steering portion 303a is a device that turns the turning wheels of the vehicle 1, such as the above-described steering wheel or handle.

The steering control portion 303b is configured with, for example, a microcomputer having a hardware processor such as a CPU. The steering control portion 303b controls, for example, an advancing direction of the vehicle 1 by driving an actuator (not illustrated) and operating the steering portion 303a on the basis of an instruction that is input via the in-vehicle network 350.

The steering portion sensor 303c is a sensing device that detects a state of the steering portion 303a, that is, a steering angle sensor that detects a steering angle of the steering portion 303a. For example, in a case where the steering portion 303a is configured with a steering wheel, the steering portion sensor 303c detects a position of the steering wheel or a rotation angle of the steering wheel. In a case where the steering portion 303a is configured with a handle, the steering portion sensor 303c may detect a position of the handle or the pressure acting on the handle. The steering portion sensor 303c outputs the detected state of the steering portion 303a to the in-vehicle network 350.

The shift system 304 controls a gear ratio of the vehicle 1. The shift system 304 includes the shift portion 304a, a shift control portion 304b, and a shift portion sensor 304c.

The shift portion 304a is a device that changes a gear ratio of the vehicle 1, such as the shift lever described above.

The shift control portion 304b is configured with a computer having a hardware processor such as a CPU. The shift control portion 304b controls, for example, a gear ratio of the vehicle 1 by driving an actuator (not illustrated) operating the shift portion 304a on the basis of an instruction that is input via the in-vehicle network 350.

The shift portion sensor 304c is a sensing device that detects a state of the shift portion 304a. For example, in a case where the shift portion 304a is configured with a shift lever, the shift portion sensor 304c detects a position of the shift lever or the pressure acting on the shift lever. The shift portion sensor 304c outputs the detected state of the shift portion 304a to the in-vehicle network 350.

The obstacle sensor 305 is a sensing device that detects information regarding an object (obstacle) that may be present around the vehicle 1. The obstacle sensor 305 includes, for example, a range finding sensor that acquires a distance to an object present around the vehicle 1. The range finding sensor may employ, for example, a sonar that transmits a sound wave and obtains a distance by receiving a sound wave reflected by an object present around the vehicle 1, or a laser radar that transmits a radio wave such as light and acquires a distance by receiving a radio wave reflected by an object present around the vehicle 1. The obstacle sensor 305 outputs the detected information to the in-vehicle network 350.

The traveling state sensor 306 is a device that detects a traveling state of the vehicle 1. The traveling state sensor 306 is, for example, a vehicle wheel sensor that detects a vehicle wheel speed of the vehicle 1, an acceleration sensor that detects an acceleration of the vehicle 1 in a front-rear direction or a leftward-rightward direction, or a gyro sensor that detects a turning speed (angular speed) of the vehicle 1. The traveling state sensor 306 outputs the detected traveling state to the in-vehicle network 350.

The control device 310 is a device that integrally controls various systems provided in the vehicle 1. As details will be described later, the control device 310 according to the present embodiment has a function of generating a display image that is a stereoscopic image of the vehicle 1 and the periphery thereof on the basis of image data (captured image) as a result of imaging in the in-vehicle camera 15, and displaying the generated display image on the display portion 8.

In the present embodiment, the display image is a stereoscopic image in which a three-dimensional space having a vehicle image that is a stereoscopic image of the vehicle 1 and a projection region that is located around the vehicle image and onto which a captured image is projected through projection conversion is viewed from a viewpoint located obliquely above the vehicle image. Alternatively, the display image may be a captured image obtained by imaging with the in-vehicle camera 15.

The control device 310 is configured with an electronic control unit (ECU) including a central processing unit (CPU) 310a, a read only memory (ROM) 310b, a random access memory (RAM) 310c, a solid state drive (SSD) 310d, a display control section 310e, and a sound control portion 310f.

The CPU 310a is a hardware processor that integrally controls the control device 310. The CPU 310a reads various control programs (computer programs) stored in the ROM 310b or the like, and realizes various functions according to instructions defined in the various control programs. Here, the various control programs include a display control program for realizing the display control process for displaying a display image as described above.

The ROM 310b is a nonvolatile main storage device that stores parameters and the like necessary for executing the above-described various control programs.

The RAM 310c is a volatile main storage device that provides a work area for the CPU 310a.

The SSD 310d is a rewritable nonvolatile auxiliary storage device. In the control device 310 according to the embodiment, a hard disk drive (HDD) may be provided as an auxiliary storage device instead of the SSD 310d (or in addition to the SSD 310d).

The display control section 310e mainly performs image processing on a captured image obtained from the in-vehicle camera 15 or generates image data to be output to the display portion 8 of the monitor device 11 among various processes that can be executed by the control device 310.

The sound control portion 310f mainly generates sound data to be output to the sound output portion 9 of the monitor device 11 among various processes that can be executed by the control device 310.

The in-vehicle network 350 communicably connects the braking system 301, the acceleration system 302, the steering system 303, the shift system 304, the obstacle sensor 305, the traveling state sensor 306, the operation input portion 10 of the monitor device 11, and the control device 310 to each other.

Meanwhile, various techniques for notifying an occupant of situations of the vehicle 1 and the periphery thereof by using the display image have been examined. For example, a technique has been examined in which a line (hereinafter, referred to as a contour guide line) representing a contour of the vehicle 1 and a trajectory (hereinafter, a predicted course guide line Technology) drawn by an end of the contour guide line according to movement of the vehicle 1 is included in a display image. According to this technique, it is possible to notify an occupant of a positional relationship between the vehicle 1 and an object present around the vehicle 1 in a more understandable manner.

However, in the above technique, since the contour guide line is displayed at a fixed position with respect to a position of an image of the vehicle 1 in the display image, in a case where an image of an object (obstacle) floating from a road surface is included in the display image, there is a probability that an occupant who sees the display image may misunderstand a distance from the vehicle 1 to the object, and thus the vehicle 1 may collide with the object.

Figure 4:
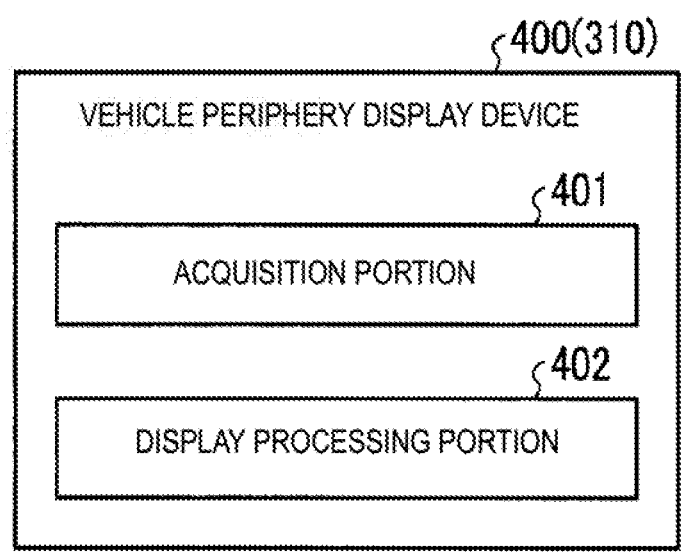
FIG. 4 is an exemplary and schematic block diagram of a functional configuration of a vehicle periphery display device of the vehicle according to the first embodiment.

Therefore, in the embodiment, by realizing the vehicle periphery display device 400 having the following function illustrated in FIG. 4 in the control device 310, when the vehicle 1 is turned, in a case where an image of an object floating from a road surface is included in a display image, it is achieved to reduce a probability that an occupant who sees the display image may misunderstand a distance from the vehicle 1 to the object, and thus the vehicle 1 may collide with the object.

FIG. 4 is an exemplary and schematic block diagram of a functional configuration of the vehicle periphery display device of the vehicle according to the first embodiment.

Next, with reference to FIG. 4, a description will be made of an example of a functional configuration of the vehicle periphery display device 400 according to the present embodiment.

Functions illustrated in FIG. 4 are realized in the control device 310 by software and hardware in cooperation. That is, the functions illustrated in FIG. 4 are realized as a result of the CPU 310a of the control device 310 reading and executing a predetermined control program stored in the ROM 310b or the like.

In the present embodiment, the functions illustrated in FIG. 4 are realized by the software and hardware in cooperation, but are not limited thereto, and at least one of the functions illustrated in FIG. 4 may be realized by dedicated hardware (circuit).

The vehicle periphery display device 400 according to the present embodiment has an acquisition portion 401 and a display processing portion 402, as illustrated in FIG. 4.

The acquisition portion 401 acquires image data of a captured image from the in-vehicle camera 15. The acquisition portion 401 also acquires a steering angle detected by the steering portion sensor 303c. The acquisition portion 401 acquires an object detection result from the obstacle sensor 305.

The display processing portion 402 generates a display image that is a stereoscopic image of the vehicle 1 and the periphery thereof on the basis of a captured image acquired by the acquisition portion 401. The display processing portion 402 causes the generated display image to be displayed on the display portion 8.

In the present embodiment, the display image is a stereoscopic image in which a three-dimensional space having a vehicle image (for example, an image of the vehicle 1 formed of a polygonal shape) that is a stereoscopic image of the vehicle 1 and a projection region that is located around the vehicle image and onto which a captured image is projected through projection conversion is viewed from a predetermined viewpoint. Here, the predetermined viewpoint is a preset viewpoint located obliquely above the vehicle image. The display image may be a captured image obtained by imaging with the in-vehicle camera 15, as described above. The display processing portion 402 may cause an image obtained by three-dimensionally restoring the vehicle 1 and the periphery thereof to be displayed as a display image on the display portion 8. Specifically, the display processing portion 402 may three-dimensionally restore the vehicle 1 and the periphery thereof by using a captured image obtained through imaging in the in-vehicle camera 15 or a result of the obstacle sensor 305 (for example, a sonar or a radar) detecting an object around the vehicle 1, and may cause an image represented by dots or lines to be displayed on the display portion 8 as a display image.

The display processing portion 402 causes the contour guide line and the predicted course guide line to be included in the display image. Here, the contour guide line is a line representing a contour of the vehicle 1, that is, a contour line of the vehicle 1. Specifically, the contour guide line is a line along the contour of the vehicle 1 in a vehicle width direction of the vehicle 1 and a direction parallel to an advancing direction of the vehicle 1. The predicted course guide line is a trajectory drawn by the contour guide line according to movement of the vehicle 1.

In the present embodiment, the display processing portion 402 causes the contour guide line and the predicted course guide line to be included in a three-dimensional space. The display processing portion 402 generates, as a display image, a stereoscopic image in which the three-dimensional space including the contour guide line and the predicted course guide line is viewed from a predetermined viewpoint.

In the present embodiment, the display processing portion 402 causes both the contour guide line and the predicted course guide line to be included in the three-dimensional space, but is not limited thereto as long as at least one of the contour guide line and the predicted course guide line is included in the three-dimensional space.

In a case where the vehicle 1 is turned, the display processing portion 402 changes positions of the contour guide line and the predicted course guide line to be present above a road surface (in the present embodiment, above positions of the contour guide line and the predicted course guide line in a case where the vehicle 1 advances straight). Consequently, in a case where the display image including the image of the object floating from the road surface is displayed on the display portion 8, the contour guide line and the predicted course guide line can be displayed in the display image at a position of an image of the object floating from the road surface or a position close thereto. As a result, in a case where there is an object floating from the road surface, it becomes easier to understand a positional relationship between the object and the vehicle 1, and it is possible to reduce a probability that an occupant who sees the display image may misunderstand a distance from the vehicle 1 to an obstacle and thus the vehicle 1 may collide with the obstacle. That is, the vehicle 1 can pass through the object more safely.

In the present embodiment, the display processing portion 402 changes the positions of both the contour guide line and the predicted course guide line in a case where the vehicle 1 is turned, but is not limited thereto as long as at least one of positions of the contour guide line and the predicted course guide line is changed. In the present embodiment, the display processing portion 402 changes the positions of the contour guide line and the expected course guide line in a case where the vehicle 1 is turned, but may change the positions of the contour guide line and the predicted course guide line to be present above the road surface even in a case where the vehicle 1 advances straight.

Figure 5:
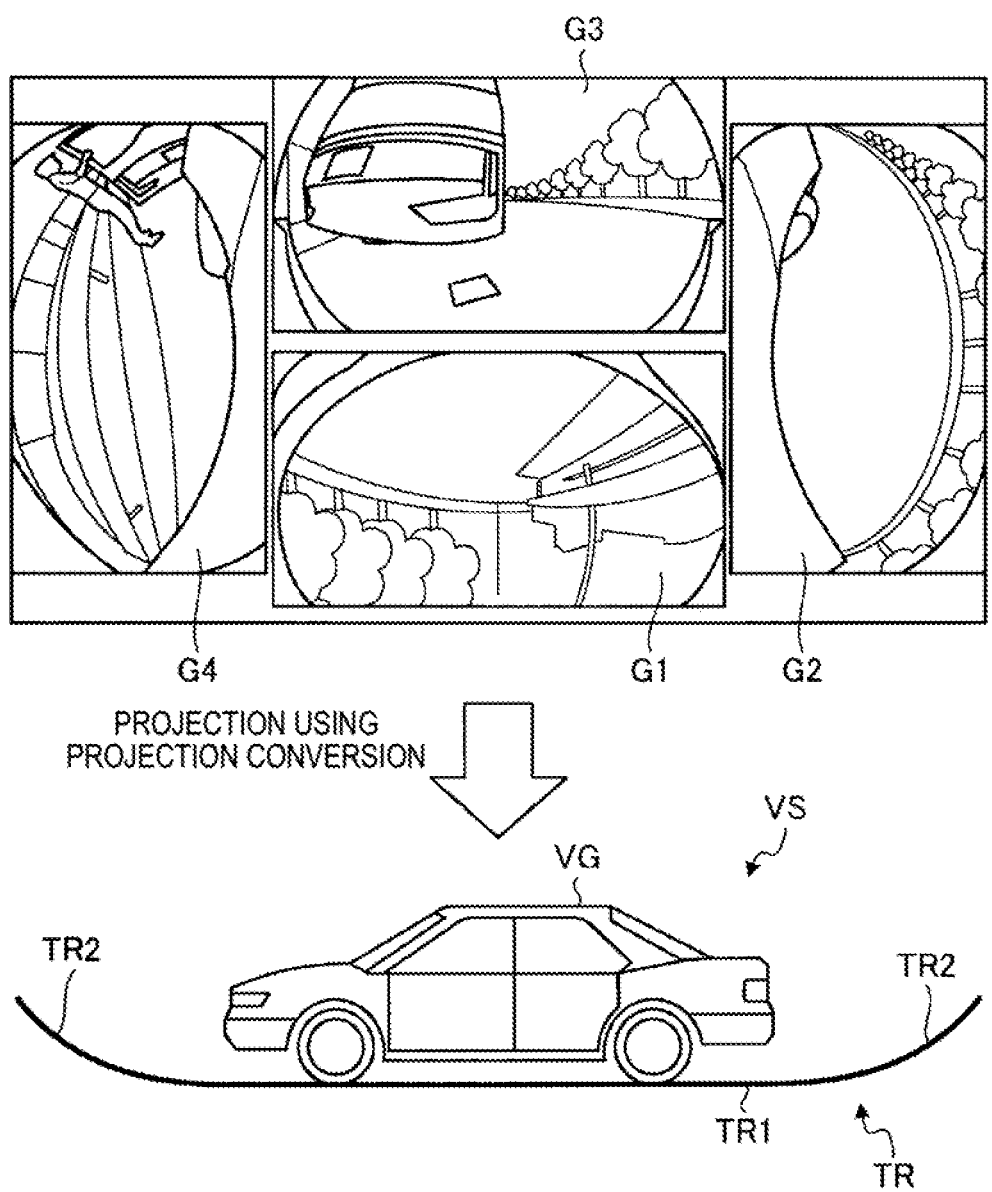
FIG. 5 is a diagram for describing an example of a process in which a captured image is projected onto a three-dimensional space by the vehicle periphery display device of the vehicle according to the first embodiment.
Figure 7A:
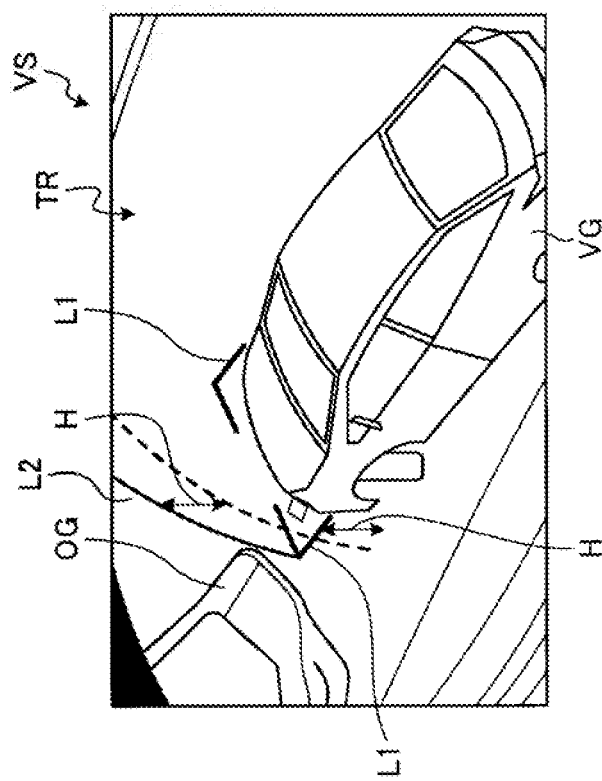
FIGS. 7A and 7B are diagrams for describing an example of a process in which positions of the contour guide line and the predicted course guide line are changed by the vehicle periphery display device of the vehicle according to the first embodiment.
Figure 7B:
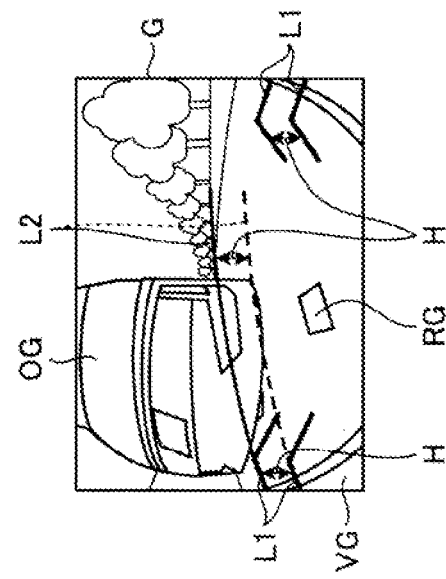

FIG. 5 is a diagram for describing an example of a process in which a captured image is projected onto a three-dimensional space by the vehicle periphery display device of the vehicle according to the first embodiment. FIG. 6 is a diagram for describing an example of a process in which a contour guide line and a predicted course guide line are drawn in a three-dimensional space by the vehicle periphery display device of the vehicle according to the first embodiment. FIGS. 7A and 7B are diagrams for describing an example of a process in which positions of the contour guide line and the predicted course guide line are changed by the vehicle periphery display device of the vehicle according to the first embodiment.

Next, with reference to FIGS. 5 to 7B, a description will be made of an example of process in which a display image is generated by the vehicle periphery display device 400.

As illustrated in FIG. 5, the acquisition portion 401 acquires a captured image G1 obtained by imaging the rearward of the vehicle 1 with the in-vehicle camera 15a, a captured image G2 obtained by imaging the rightward of the vehicle 1 with the in-vehicle camera 15b, a captured image G3 obtained by imaging the frontward of the vehicle 1 with the in-vehicle camera 15c, and a captured image G4 obtained by imaging the leftward of the vehicle 1 with the in-vehicle camera 15d.

Next, the display processing portion 402 projects the captured images G1 to G4 onto the three-dimensional space VS through projection conversion. Here, as illustrated in FIG. 5, the three-dimensional space VS is a stereoscopic space including a vehicle image VG which is a stereoscopic image of the vehicle 1 and a projection region TR around the vehicle image VG. In the present embodiment, the projection region TR has a projection surface TR1 (hereinafter, referred to as a plane projection region) that is horizontal to the vehicle image VG and a projection region TR2 (hereinafter, referred to as a stereoscopic projection region) that rises above the plane projection region TR1.

Specifically, as illustrated in FIG. 5, the display processing portion 402 converts each coordinate in each of the captured images G1 to G4 into a coordinate in the projection region TR through projection conversion. Next, the display processing portion 402 projects an image at each coordinate in each of the captured images G1 to G4 to a position represented by the coordinate subjected to the projection conversion from each coordinate in the projection region TR. Consequently, the display processing portion 402 projects the captured images G1 to G4 onto the projection region TR.

As illustrated in FIG. 6, the display processing portion 402 causes a contour guide line L1 and a predicted course guide line L2 to be included in the three-dimensional space VS. In the present embodiment, the display processing portion 402 causes a line that represents a part (for example, a corner) of the contour of the vehicle 1 to be displayed as the contour guide line L1 as illustrated in FIG. 6, but is not limited thereto, and may cause a line representing the entire contour of the vehicle 1 to be displayed as the contour guide line L1.

In the present embodiment, as illustrated in FIG. 6, the contour guide line L1 has a margin in the vehicle width direction D1 of a vehicle image (hereinafter, referred to as a vehicle width direction margin) and a margin in the advancing direction D2 of the vehicle image (hereinafter, referred to as an advancing direction margin) with respect to a contour of the vehicle image. In the present embodiment, the contour guide line L1 has the vehicle width direction margin and the advancing direction margin, but may not have the vehicle width direction margin and the advancing direction margin.

Meanwhile, as illustrated in FIG. 6, in a case where the captured images G1 to G4 including an image OG (hereinafter, referred to as an obstacle image; for example, a bumper of another vehicle) of an obstacle O (object) floating from the road surface are projected onto the projection region TR through projection conversion, as illustrated in FIG. 6, the obstacle image OG is projected on the three-dimensional space VS as if the obstacle image is located at a position farther from the vehicle image VG than a position P where the obstacle O in the real space RS is present.

As illustrated in FIG. 6, the obstacle image OG of the obstacle floating from the road surface is not continued with an image RG of the road surface at the position P where the obstacle O is present in the real space RS. Therefore, an occupant who sees the display image in which the three-dimensional space VS is viewed from a predetermined viewpoint may misunderstand that the obstacle O is present at a position farther from the vehicle 1 than the position at which the obstacle O is present in the real space RS.

Therefore, in a case where the vehicle 1 is turned, as illustrated in FIG. 7A, the display processing portion 402 changes positions of the contour guide line L1 and the predicted course guide line L2 upward by a predetermined height H in an upward-downward direction of the vehicle image VG in the three-dimensional space VS. Here, the predetermined height H corresponds to a height (for example, 60 to 70 cm) of an end (for example, a bumper) of the vehicle 1 in the advancing direction or a height of the obstacle O present around the vehicle 1. Consequently, the contour guide line L1 and the predicted course guide line L2 can be displayed at a location that is likely to collide with the obstacle O in the contour of the vehicle 1. As a result, the vehicle 1 can pass through the obstacle O more safely.

In the present embodiment, in a case where the vehicle 1 is turned, the display processing portion 402 changes positions of the contour guide line L1 and the predicted course guide line L2 by the predetermined height H upward regardless of a steering angle of the vehicle 1, but may change the positions of the contour guide line L1 and the predicted course guide line L2 upward depending on the steering angle of the vehicle 1. In the present embodiment, the display processing portion 402 changes the positions of the contour guide line L1 and the predicted course guide line L2 upward by the predetermined height H, but may change the positions of the contour guide line L1 and the predicted course guide line L2 upward, for example, by a height corresponding to a height of the highest portion of the vehicle 1.

The display processing portion 402 causes a stereoscopic image in which the three-dimensional space VS whose positions of the contour guide line L1 and the predicted course guide line L2 have been changed upward is viewed from a predetermined viewpoint, to be displayed as a display image, on the display portion 8. In other words, in a case where the vehicle 1 is turned, the display processing portion 402 draws the contour guide line L1 and the predicted course guide line L2 in a display image such that the contour guide line L1 and the predicted course guide line L2 are present above the road surface by the predetermined height H in the display image.

Consequently, in a case where the display image including the obstacle image OG floating from the road surface is displayed on the display portion 8, the contour guide line L1 and the predicted course guide line L2 can be displayed at a position of being likely to come into contact with the vehicle 1 in the obstacle image OG included in the display image. As a result, in a case where there is the obstacle O floating from the road surface, a positional relationship between the obstacle O and the vehicle 1 can be easily understood, and thus it is possible to reduce a probability that an occupant who sees the display image may misunderstand a distance from the vehicle 1 to the obstacle, and thus the vehicle 1 may collide with the obstacle. That is, the vehicle 1 can pass through the obstacle O more safely.

On the other hand, in a case where the vehicle 1 advances straight, the display processing portion 402 draws (projects) the contour guide line L1 and the predicted course guide line L2 in the projection region TR. Consequently, in a case where the vehicle 1 advances straight, the display processing portion 402 draws the contour guide line L1 and the predicted course guide line L2 in a display image such that the contour guide line L1 and the predicted course guide line L2 are present on the road surface.

In the present embodiment, in a case where the vehicle 1 advances straight, the display processing portion 402 draws the contour guide line L1 and the predicted course guide line L2 in a display image such that the contour guide line L1 and the predicted course guide line L2 are present on the road surface, but may draw the contour guide line L1 and the predicted course guide line L2 in the display image such that the contour guide line L1 and the predicted course guide line L2 are present above the road surface by the predetermined height H in the display image even in a case where the vehicle 1 advances straight.

In the present embodiment, the display processing portion 402 determines that the vehicle 1 is turned in a case where a steering angle acquired by the acquisition portion 401 is equal to or more than a predetermined steering angle, and draws the contour guide line L1 and the predicted course guide line L2 to be present above the road surface in a display image. Consequently, it is possible to prevent positions of the contour guide line L1 and the predicted course guide line L2 from being changed even though a steering angle of the vehicle 1 is small. Here, the predetermined steering angle is a preset steering angle, and is a steering angle from which the vehicle 1 is determined as being turned.

In the present embodiment, the display processing portion 402 gradually changes positions of the contour guide line L1 and the predicted course guide line L2 in a case where the vehicle 1 is turned. Consequently, when the positions of the contour guide line L1 and the predicted course guide line L2 are changed, it is possible to reduce that an occupant feels uncomfortable due to the positions of the contour guide line L1 and the predicted course guide line L2 abruptly being changed.

In this case, as the contour guide line L1 and the predicted course guide line L2 approach a target height (a predetermined height in the present embodiment), the display processing portion 402 may reduce a speed of changing the positions of the contour guide line L1 and the predicted course guide line L2. Consequently, when the positions of the contour guide line L1 and the predicted course guide line L2 are changed, it is possible to further reduce that an occupant feels uncomfortable due to the positions of the contour guide line L1 and the predicted course guide line L2 abruptly being changed.

In the present embodiment, the display processing portion 402 may change positions of the contour guide line L1 and the predicted course guide line L2 according to a change in a steering angle of the vehicle 1 regardless of whether or not the steering angle of the vehicle 1 is equal to or more than a predetermined steering angle. Specifically, the display processing portion 402 increases a change amount of the positions of the contour guide line L1 and the predicted course guide line L2 as the steering angle (absolute value) of the vehicle 1 increases.

In the present embodiment, the display processing portion 402 causes both of the contour guide line L1 and the predicted course guide line L2 whose positions have not been changed (hereinafter, referred to as guide lines L1 and L2 before being changed) and the contour guide line L1 and the predicted course guide line L2 whose positions have been changed (hereinafter, referred to as guide lines L1 and L2 after being changed) to be included in a display image, but at least the guide lines L1 and L2 after being changed may be included in the display image.

In other words, the display processing portion 402 may leave the guide lines L1 and L2 before being changed in the display image in a case where the vehicle 1 is turned. Consequently, it is possible to easily recognize that the positions of the contour guide line L1 and the predicted course guide line L2 have been changed, and thus to prompt an occupant to drive the vehicle 1 along the guide lines L1 and L2 after being changed. As a result, the vehicle 1 can pass through the obstacle O more safely.

In a case where both the guide lines L1 and L2 before being changed and the guide lines L1 and L2 after being changed are included in a display image, the display processing portion 402 may make display modes of the two different from each other. For example, the display processing portion 402 causes the guide lines L1 and L2 before being changed gray and displays the guide lines L1 and L2 after being changed to be displayed in color.

Consequently, in a case where both the guide lines L1 and L2 before being changed and the guide lines L1 and L2 after being changed are included in the display image, it is possible to easily determine whether to operate the vehicle 1 along which ones of the contour guide lines L1 and the predicted course guide lines L2. As a result, it is possible to further reduce a probability that an occupant who sees the display image may misunderstand a distance from the vehicle 1 to an obstacle and thus the vehicle 1 may collide with the obstacle.

In the present embodiment, the display processing portion 402 uses different colors for the guide lines L1 and L2 before being changed and the guide lines L1 and L2 after being changed, but is not limited thereto as long as display modes of the guide lines L1 and L2 before being changed and the guide lines L1 and L2 after being changed are different from each other. For example, the display processing portion 402 causes the guide lines L1 and L2 after being changed to be displayed (drawn) with solid lines, and causes the guide lines L1 and L2 before being changed to be displayed (drawn) with dashed lines.

In the present embodiment, the display processing portion 402 may also make display modes of the contour guide line L1 and the predicted course guide line L2 whose positions have been changed different from each other. For example, the display processing portion 402 causes the contour guide line L1 whose position has been changed to be displayed in blue, and causes the predicted course guide line L2 whose position has been changed to be displayed in yellow.

In the present embodiment, the display processing portion 402 changes positions of the contour guide line L1 and the predicted course guide line L2 in the three-dimensional space VS regardless of whether or not the obstacle O is detected by the obstacle sensor 305, but is not limited thereto.

Specifically, in a case where the obstacle O is detected by the obstacle sensor 305, the display processing portion 402 changes positions of the contour guide line L1 and the predicted course guide line L2 upward in the three-dimensional space VS. On the other hand, in a case where the obstacle O is not detected by the obstacle sensor 305, the display processing portion 402 does not change the positions of the contour guide line L1 and the predicted course guide line L2 upward in the three-dimensional space VS.

In other words, in a case where the obstacle O is detected by the obstacle sensor 305, the display processing portion 402 changes the positions of the contour guide line L1 and the predicted course guide line L2 in the display image. Consequently, an occupant of the vehicle 1 can intuitively recognize that the obstacle O is present in a course of the vehicle 1, and thus it is possible to further reduce a probability that the vehicle 1 may collide with the obstacle O.

In the present embodiment, the display processing portion 402 makes a display mode of the guide lines L1 and L2 after being changed different from a display mode of the guide lines L1 and L2 before being changed regardless of whether or not the obstacle O is detected by the obstacle sensor 305, but is not limited thereto.

Specifically, in a case where the obstacle O is detected by the obstacle sensor 305, the display processing portion 402 causes the guide lines L1 and L2 after being changed to be displayed in color (or blinking). On the other hand, in a case where the obstacle O is not detected by the obstacle sensor 305, the display processing portion 402 causes the guide lines L1 and L2 after being changed to be displayed in gray.

In other words, the display processing portion 402 changes display modes of the contour guide line L1 and the predicted course guide line L2 in a display image according to whether or not the obstacle O is detected by the obstacle sensor 305. Consequently, an occupant of the vehicle 1 can intuitively recognize that the obstacle O is present in a course of the vehicle 1, and thus it is possible to further reduce a probability that the vehicle 1 may collide with the obstacle O.

Also in a case where a captured image (for example, a front view) obtained by imaging with the in-vehicle camera 15 (for example, the in-vehicle camera 15c) is displayed on the display portion 8 as the display image G, the display processing portion 402 changes positions of the contour guide line L1 and the predicted course guide line L2 in the captured image (display image G) such that the contour guide line L1 and the predicted course guide line L2 are present above the road surface when the vehicle 1 is turned. Specifically, when the vehicle 1 is turned, as illustrated in FIG. 7B, the display processing portion 402 changes positions of the contour guide line L1 and the predicted course guide line L2 included in the captured image (display image G) upward by the predetermined height H.

As described above, according to the vehicle 1 of the first embodiment, in a case where a display image including an image of an object floating from a road surface is displayed on the display portion 8, the contour guide line and the predicted course guide line can be displayed at or near a position of the image of the object floating from the road surface in the display image. As a result, in a case where there is an object floating from the road surface, it becomes easier to understand a positional relationship between the object and the vehicle 1, and it is possible to reduce a probability that an occupant who sees the display image may misunderstand a distance from the vehicle 1 to an obstacle and thus the vehicle 1 may collide with the obstacle. That is, the vehicle 1 can pass through the object more safely.

Second Embodiment

The present embodiment is an example in which a viewpoint of a display image is changed according to a turning direction of the vehicle 1 in a case where a stereoscopic image of a vehicle and the periphery thereof is displayed as the display image. In the following description, a description of the same configuration as that in the first embodiment will not be repeated.

In the present embodiment, in a case where the vehicle 1 advances straight, the display processing portion 402 moves a predetermined viewpoint to a reference viewpoint located behind a vehicle image and at the center of the vehicle image in the vehicle width direction, and generates, as a display image, a stereoscopic image in which a three-dimensional space is viewed from the predetermined viewpoint moved to the reference viewpoint. The display processing portion 402 displays the generated display image on the display portion 8.

Consequently, in a case where the vehicle 1 advances straight, it is possible to display a display image in which a vehicle width of the vehicle 1 is easily recognized. As a result, in a case where the vehicle 1 advances straight, it is possible to easily understand a positional relationship with an object present on the sideward of the vehicle 1.

In the present embodiment, in a case where the vehicle 1 is turned, the display processing portion 402 moves a predetermined viewpoint to a viewpoint (hereinafter, referred to as a target viewpoint) shifted toward an opposite side to a turning direction of the vehicle 1 with respect to a reference viewpoint. The display processing portion 402 generates, as a display image, a stereoscopic image in which a three-dimensional space is viewed from the predetermined viewpoint moved to the target viewpoint. The display processing portion 402 causes the generated display image to be displayed on the display portion 8.

Consequently, in a case where the vehicle 1 is turned, it is possible to display a display image in which a location where an occupant is to be careful about contact with an object during turning of the vehicle 1 is seen. As a result, in a case where the vehicle 1 is turned, the vehicle 1 can travel more safely without contact with an object.

FIG. 8 is a diagram for describing an example of a process in which a display image is displayed by the vehicle periphery display device of the vehicle according to the second embodiment.

Next, with reference to FIG. 8, a description will be made of an example of a process in which a display image is displayed by the vehicle periphery display device 400.

In a case where the vehicle 1 advances straight (in a case where a steering angle of the vehicle 1 is 0 degrees), as illustrated in FIG. 8, the display processing portion 402 causes a stereoscopic image in which the three-dimensional space VS is viewed from a predetermined viewpoint that is moved to a reference viewpoint, to be displayed on the display portion 8 as the display image G.

In a case where the vehicle 1 is turned to the right, as illustrated in FIG. 8, the display processing portion 402 causes a stereoscopic image in which the three-dimensional space VS is viewed from a predetermined viewpoint that is moved to a left-shifted target viewpoint from a reference viewpoint to be displayed on the display portion 8 as the display image G.

In a case where the vehicle 1 is turned to the left, as illustrated in FIG. 8, the display processing portion 402 causes a stereoscopic image in which the three-dimensional space VS is viewed from a predetermined viewpoint that is moved to a right-shifted target viewpoint from a reference viewpoint to be displayed on the display portion 8 as the display image G.

In the present embodiment, in a case where a steering angle of the vehicle 1 is equal to or more than a predetermined steering angle, the display processing portion 402 moves a predetermined viewpoint to a target viewpoint shifted toward an opposite side to a turning direction of the vehicle 1 with respect to a reference viewpoint. In this case, the display processing portion 402 may gradually move the predetermined viewpoint toward the target viewpoint. When gradually moving the predetermined viewpoint toward the target viewpoint, the display processing portion 402 may reduce a speed at which the predetermined viewpoint is changed as the predetermined viewpoint comes closer to the target viewpoint.

In the present embodiment, the display processing portion 402 may obtain a target viewpoint according to a steering angle of the vehicle 1 and may cause a stereoscopic image in which the three-dimensional space VS is viewed from a predetermined viewpoint moved to the target viewpoint to be displayed on the display portion 8 as the display image G regardless of whether the steering angle of the vehicle 1 is equal to or more than a predetermined steering angle.

Specifically, the display processing portion 402 obtains a horizontal angle according to the following Equation (1).

$$\text{Horizontal angle} = \text{steering angle of vehicle 1} \times \text{conversion coefficient} \tag{1}$$

Here, the horizontal angle is an angle by which a predetermined viewpoint is shifted in a horizontal direction from a reference viewpoint with respect to an advancing direction D2 of the vehicle 1. The conversion coefficient is a coefficient set in advance.

Next, the display processing portion 402 obtains, as the target viewpoint, a viewpoint shifted from the reference viewpoint in the horizontal direction by the obtained horizontal angle with respect to the advancing direction D2 of the vehicle 1. The display processing portion 402 causes a stereoscopic image in which the three-dimensional space VS is viewed from a predetermined viewpoint that is moved to the target viewpoint, to be displayed on the display portion 8 as the display image G.

For example, in a case where a steering angle of the vehicle 1 becomes −300 degrees and the vehicle 1 is turned to the right, the display processing portion 402 obtains the horizontal angle=−40 degrees by using the above Equation (1). As illustrated in FIG. 8, the display processing portion 402 causes a stereoscopic image in which the three-dimensional space VS is viewed from a predetermined viewpoint that is moved to a target viewpoint shifted by −40 degrees in the horizontal direction from the reference viewpoint with respect to the advancing direction D2 of the vehicle 1 to be displayed on the display portion 8 as the display image G.

For example, in a case where a steering angle of the vehicle 1 is +300 degrees and the vehicle 1 is turned to the left, the display processing portion 402 obtains the horizontal angle=+40 degrees by using the above Equation (1). As illustrated in FIG. 8, the display processing portion 402 causes a stereoscopic image in which the three-dimensional space VS is viewed from a predetermined viewpoint that is moved to a target viewpoint shifted by +40 degrees in the horizontal direction from the reference viewpoint with respect to the advancing direction D2 of the vehicle 1 to be displayed on the display portion 8 as the display image G.

FIG. 9 is a diagram for describing another example of a process in which a display image is displayed by the vehicle periphery display device of the vehicle according to the second embodiment.

Next, a description will be made of an example of a process in which the display image G is displayed by the vehicle periphery display device 400 when the vehicle 1 travels forward and backward with reference to FIG. 9.

In a case where the vehicle 1 advances straight, as illustrated in FIG. 9, the display processing portion 402 causes a stereoscopic image in which the three-dimensional space VS is viewed from a predetermined viewpoint that is moved to a reference viewpoint to be displayed on the display portion 8 as the display image G when the vehicle 1 travels both forward and backward.

Also in a case where the vehicle 1 is turned, as illustrated in FIG. 9, the display processing portion 402 causes a stereoscopic image in which the three-dimensional space VS is viewed from a predetermined viewpoint that is moved to a target viewpoint shifted toward an opposite side to a turning direction of the vehicle 1 with respect to a reference viewpoint to be displayed as the display image G when the vehicle 1 travels both forward and backward.

However, in a case where the vehicle 1 travels backward, as illustrated in FIG. 9, the display processing portion 402 may cause a stereoscopic image in which the three-dimensional space VS is viewed from a predetermined viewpoint further behind the vehicle image VG than in a case where the vehicle 1 advances straight, to be displayed on the display portion 8 as the display image G. Consequently, a rearward visual field of the vehicle image VG in the display image G can be widened. As a result, traveling safety can be improved when the vehicle 1 travels backward.

In the present embodiment, the display processing portion 402 moves a predetermined viewpoint regardless of whether or not an obstacle is detected by the obstacle sensor 305, but may move a predetermined viewpoint only in a case where an obstacle is detected by the obstacle sensor 305. Consequently, it is possible to easily understand whether or not there is an obstacle around the vehicle 1 depending on whether or not a predetermined viewpoint has been moved.

Figure 10A:
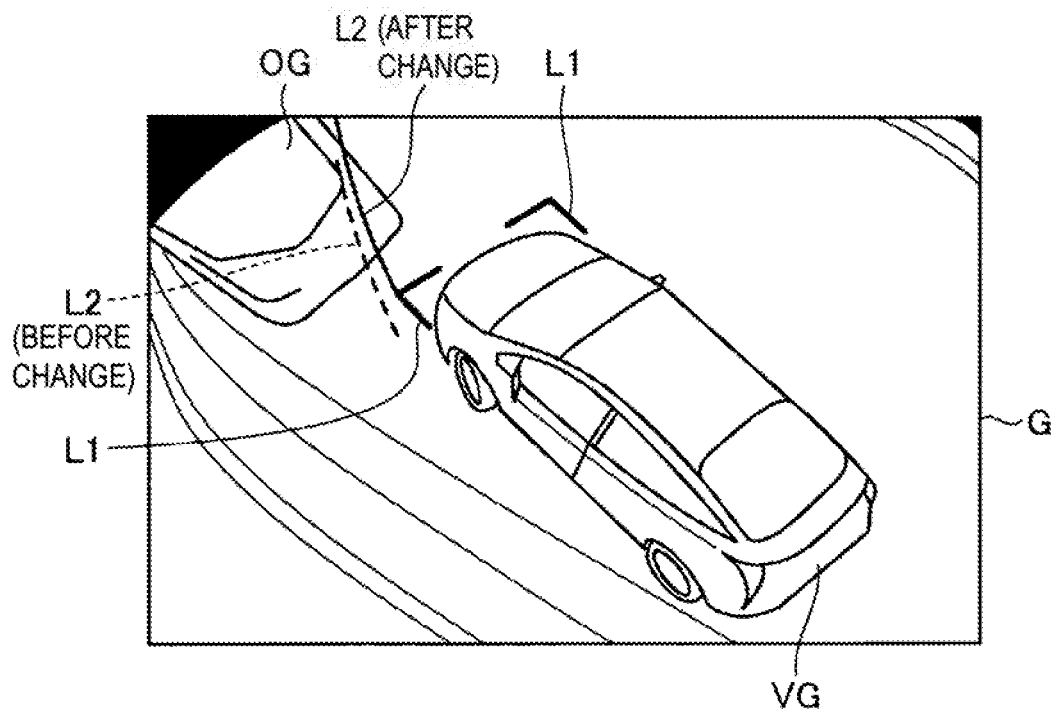
FIGS. 10A and 10B are diagrams for describing an example of a process in which a contour guide line and a predicted course guide line are displayed by the vehicle periphery display device of the vehicle according to the second embodiment.
Figure 10B:
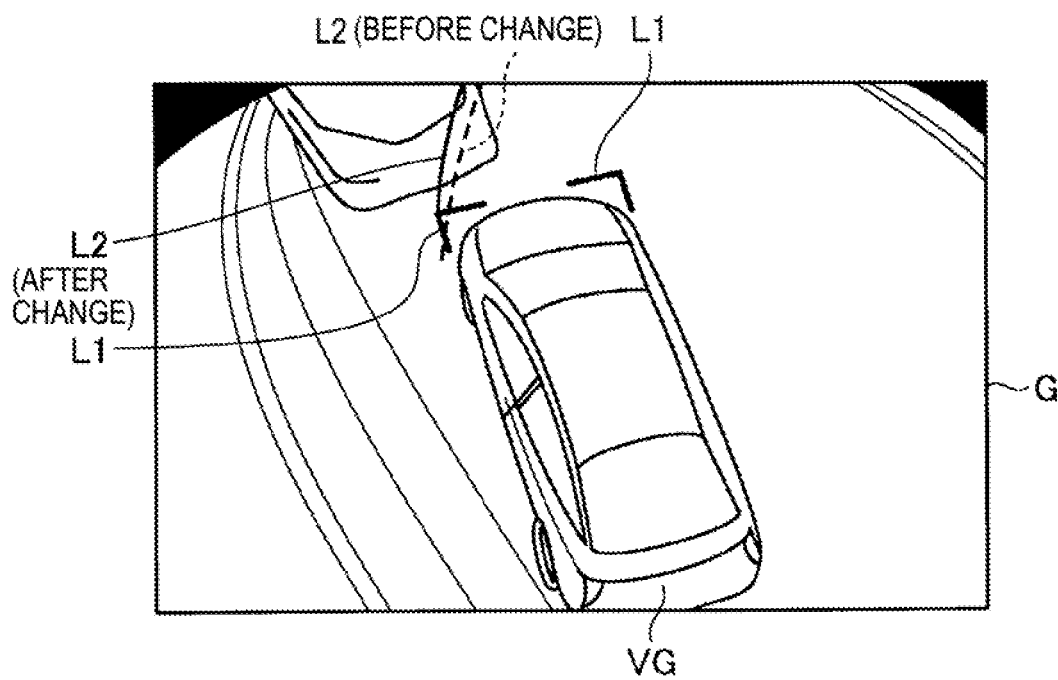

FIGS. 10A and 10B are diagrams for describing an example of a process in which the contour guide line and the predicted course guide line are displayed by the vehicle periphery display device of the vehicle according to the second embodiment.

Next, with reference to FIGS. 10A and 10B, a description will be made of an example of a process of displaying the contour guide line L1 and the predicted course guide line L2.

As illustrated in FIG. 10A, in a case where the vehicle 1 is turned (for example, in a case where the vehicle 1 is turned to the right), when a predetermined viewpoint is shifted toward an opposite side to a turning direction of the vehicle 1 with respect to a reference viewpoint, the predicted course guide line L2 whose position has not been changed (hereinafter, referred to as a predicted course guide line L2 before being changed) may be displayed outside the predicted course guide line L2 whose position has been changed (hereinafter, referred to as a predicted course guide line L2 after being changed).

In this case, when the vehicle 1 travels along the predicted course guide line L2 after being changed, it seems that the vehicle 1 does not collide with an obstacle. However, in order to reduce a probability of collision between the vehicle 1 and an object, it is preferable to determine whether or not the vehicle 1 collides with an object according to the predicted course guide line L2 located outside in a center direction of a circular arc drawn by the vehicle 1 (for example, the vehicle wheel of the vehicle 1) when the vehicle 1 is turned.

Therefore, in the present embodiment, in a case where the vehicle 1 is turned, as illustrated in FIG. 10B, the display processing portion 402 moves a predetermined viewpoint to a target viewpoint at which the predicted course guide line L2 after being changed is located further toward a rotation center side of the vehicle image VG than the predicted course guide line L2 before being changed in the display image G. In other words, the display processing portion 402 moves the predetermined viewpoint to the target viewpoint at which the predicted course guide line L2 after being changed is displayed outside the predicted course guide line L2 before being changed in the center direction of the circular arc drawn by the vehicle 1 (for example, the vehicle wheels of the vehicle 1).

For example, in a case where a steering angle of the vehicle 1 reaches a predetermined threshold value (for example, 15 degrees), the display processing portion 402 terminates the movement of the predetermined viewpoint, and does not move the predetermined viewpoint even though the steering angle of the vehicle 1 is increased. Here, the predetermined threshold value is a steering angle at which the predicted course guide line L2 before being changed is displayed outside the predicted course guide line L2 after being changed.

Consequently, it is possible to prevent the predicted course guide line L2 after being changed from being displayed inside the predicted course guide line L2 before being changed. As a result, in the process in which a steering angle of the vehicle 1 is being increased, it is possible to reduce a probability that the vehicle 1 may collide with an obstacle due to a misunderstanding that the vehicle 1 will not collide with the obstacle when the vehicle 1 travels along the predicted course guide line L2 after being changed.

In the present embodiment, of the predicted course guide line L2 after being changed and the predicted course guide line L2 before being changed, the display processing portion 402 causes the predicted course guide line L2 located outside in the center direction of the circular arc drawn by the vehicle 1 to be displayed in a highlighted manner. In other words, in a case where a steering angle of the vehicle 1 reaches the predetermined threshold value, the display processing portion 402 replaces a display mode of the predicted course guide line L2 after being changed and a display mode of the predicted course guide line L2 before being changed with each other.

Consequently, in the process in which a steering angle of the vehicle 1 is increased and a predetermined viewpoint is moved, even though a positional relationship between the predicted course guide line L2 after being changed and the predicted course guide line L2 before being changed in the center direction of the circular arc drawn by the vehicle 1 changes, it is possible to reduce a probability that the vehicle 1 may collide with an obstacle due to a misunderstanding that the vehicle 1 will not collide with the obstacle when the vehicle 1 travels along the predicted course guide line L2 after being changed.

In the present embodiment, the display processing portion 402 causes the predicted course guide line L2 after being changed to be included in the display image G even after a steering angle of the vehicle 1 reaches the predetermined threshold value (that is, even after the predicted course guide line L2 after being changed is displayed inside the predicted course guide line L2 before being changed in the center direction of the circular arc drawn by the vehicle 1), but may delete the predicted course guide line L2 after being changed from the display image G after the steering angle of the vehicle 1 reaches the predetermined threshold value. Consequently, in the process in which the steering angle of the vehicle 1 is increased and the predetermined viewpoint is moved, it is possible to reduce a probability that the vehicle 1 may collide with an obstacle due to a misunderstanding that the vehicle 1 will not collide with the obstacle when the vehicle 1 travels along the predicted course guide line L2 after being changed.

In the present embodiment, the display processing portion 402 causes the predicted course guide line L2 before being changed to be included in the display image G until a steering angle of the vehicle 1 reaches a predetermined threshold value (that is, while the predicted course guide line L2 after being changed is displayed outside the predicted course guide line L2 before being changed in the center direction of the circular arc drawn by the vehicle 1), but may delete the predicted course guide line L2 before being changed from the display image G until the steering angle of the vehicle 1 reaches the predetermined threshold value. In other words, the display processing portion 402 may cause only the predicted course guide line L2 displayed outside in the center direction of the circular arc drawn by the vehicle 1 to be included in the display image G of the predicted course guide line L2 before being changed and the predicted course guide line L2 after being changed.

As described above, according to the vehicle 1 of the second embodiment, in a case where the vehicle 1 is turned, it is possible to display a display image in which a location where an occupant is to be careful about contact with an object during turning of the vehicle 1 is seen. As a result, in a case where the vehicle 1 is turned, the vehicle 1 can travel more safely without contact with an object.

A vehicle periphery display device according to an embodiment includes, as an example, an acquisition portion that acquires a captured image obtained by imaging a periphery of a vehicle with an imaging portion; and a display processing portion that causes a display image that is a stereoscopic image of the vehicle and the periphery of the vehicle to be displayed on a display portion on the basis of the captured image, in which the display processing portion causes at least one of a contour guide line representing a contour of the vehicle, and a predicted course guide line that is a trajectory drawn by the contour guide line according to movement of the vehicle to be included in the display image, and changes a position of at least one of the contour guide line and the predicted course guide line such that the contour guide line and the predicted course guide line are present above a road surface in a case where the vehicle is turned. Therefore, as an example, in a case where there is an object floating from the road surface, it becomes easier to understand a positional relationship between the object and the vehicle, and thus it is possible to further reduce a probability that an occupant who sees the display image may misunderstand a distance from the vehicle to an obstacle and thus the vehicle may collide with the obstacle.

In the vehicle periphery display device of the embodiment, as an example, the display processing portion may cause a stereoscopic image in which a three-dimensional space having a vehicle image that is a stereoscopic image of the vehicle and a projection region that is located around the vehicle image and onto which the captured image is projected through projection conversion is viewed from a predetermined viewpoint located obliquely above the vehicle image, or an image obtained by three-dimensionally restoring the periphery of the vehicle, to be displayed on the display portion as the display image. Therefore, as an example, in a case where there is an object floating from the road surface, it becomes easier to understand a positional relationship between the object and the vehicle, and thus it is possible to further reduce a probability that an occupant who sees the display image may misunderstand a distance from the vehicle to an obstacle and thus the vehicle may collide with the obstacle.

In the vehicle periphery display device of the embodiment, as an example, the display processing portion may draw at least one of the contour guide line and the predicted course guide line in the display image such that the contour guide line and the predicted course guide line are present on the road surface in a case where the vehicle advances straight, and draw at least one of the contour guide line and the predicted course guide line in the display image such that the contour guide line and the predicted course guide line are present above the road surface by a predetermined height in a case where the vehicle is turned. Therefore, as an example, in a case where there is an object floating from the road surface, it becomes easier to understand a positional relationship between the object and the vehicle, and thus it is possible to further reduce a probability that an occupant who sees the display image may misunderstand a distance from the vehicle to an obstacle and thus the vehicle may collide with the obstacle.

In the vehicle periphery display device of the embodiment, as an example, the predetermined height may be a height corresponding to a height of an end of the vehicle in an advancing direction of the vehicle or a height of an object present around the vehicle. Therefore, as an example, the vehicle can pass through the obstacle more safely.

In the vehicle periphery display device of the embodiment, as an example, in a case where a steering angle of the vehicle is equal to or more than a predetermined steering angle, the display processing portion may determine that the vehicle is turned, and change the position of at least one of the contour guide line and the predicted course guide line. Therefore, as an example, it is possible to prevent positions of the contour guide line and the predicted course guide line from being changed even though a steering angle of the vehicle is small.

In the vehicle periphery display device of the embodiment, as an example, in a case where the vehicle is turned, the display processing portion may gradually change the position of at least one of the contour guide line and the predicted course guide line. Therefore, as an example, when positions of the contour guide line and the predicted course guide line are changed, it is possible to reduce that an occupant feels uncomfortable due to the positions of the contour guide line and the predicted course guide line abruptly being changed.

In the vehicle periphery display device of the embodiment, as an example, in a case where the vehicle is turned, the display processing portion may leave at least one of the contour guide line and the predicted course guide line whose position has not been changed in the display image. Therefore, as an example, it is possible to easily recognize that positions of the contour guide line and the predicted course guide line have been changed, and thus to prompt an occupant to drive the vehicle along the contour guide line and the predicted course guide line whose positions have been changed.

In the vehicle periphery display device of the embodiment, as an example, the display processing portion may make a display mode of at least one of the contour guide line and the predicted course guide line whose position has not been changed different from a display mode of at least one of the contour guide line and the predicted course guide line whose position has been changed. Therefore, as an example, it is possible to further reduce a probability that an occupant who sees the display image may misunderstand a distance from the vehicle to an obstacle and thus the vehicle may collide with the obstacle.

In the vehicle periphery display device of the embodiment, as an example, in a case where the vehicle is turned, the display processing portion may move the predetermined viewpoint to a viewpoint shifted toward an opposite side to a turning direction of the vehicle with respect to a reference viewpoint, the reference viewpoint being located behind the vehicle image and at a center of the vehicle image in a vehicle width direction of the vehicle image. Therefore, as an example, in a case where the vehicle is turned, the vehicle can travel more safely without contact with an object.

In the vehicle periphery display device of the embodiment, as an example, in a case where the vehicle is turned, when the predicted course guide line whose position has not been changed is left in the display image, the display processing portion may move the predetermined viewpoint to a viewpoint at which the predicted course guide line whose position has been changed is displayed outside the predicted course guide line whose position has not been changed. Therefore, as an example, in the process in which a steering angle of the vehicle is being increased, it is possible to reduce a probability that the vehicle may collide with an obstacle due to a misunderstanding that the vehicle will not collide with the obstacle when the vehicle travels along the predicted course guide line whose position has been changed.

In the vehicle periphery display device of the embodiment, as an example, in a case where an object present around the vehicle is detected by an obstacle sensor, the display processing portion may change the position of at least one of the contour guide line and the predicted course guide line. Therefore, as an example, an occupant of the vehicle can intuitively recognize that an obstacle is present in a course of the vehicle, and thus it is possible to further reduce a probability that the vehicle may collide with the obstacle.

In the vehicle periphery display device of the embodiment, as an example, in a case where an object present around the vehicle is detected by an obstacle sensor, the display processing portion may move the predetermined viewpoint. Therefore, as an example, it is possible to easily understand whether or not there is an obstacle around the vehicle depending on whether or not the predetermined viewpoint has been moved.

In the vehicle periphery display device according to the embodiment, as an example, the display processing portion may change a display mode of at least one of the contour guide line and the predicted course guide line according to whether or not an object present around the vehicle is detected by an obstacle sensor. Therefore, as an example, an occupant of the vehicle can intuitively recognize that an obstacle is present in a course of the vehicle, and thus it is possible to further reduce a probability that the vehicle may collide with the obstacle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle periphery display device comprising:
at least one processor configured to implement:
an acquisition portion that acquires a captured image obtained by imaging a periphery of a vehicle with an imaging portion; and
a display processing portion that causes a display image that is a stereoscopic image of the vehicle and the periphery of the vehicle to be displayed on a display portion on the basis of the captured image, wherein
the display processing portion causes at least one of a contour guide line representing a contour of the vehicle, and a predicted course guide line that is a trajectory drawn by the contour guide line according to movement of the vehicle to be included in the display image, and when the vehicle is turned, changes a position of at least one of the contour guide line and the predicted course guide line such that the contour guide line and the predicted course guide line are present above the contour guide line of traveling straight and the predicted course guide line of traveling straight a road surface in a case where the vehicle is turned.

2. The vehicle periphery display device according to claim 1, wherein
the display processing portion causes a stereoscopic image in which a three-dimensional space having a vehicle image that is a stereoscopic image of the vehicle and a projection region that is located around the vehicle image and onto which the captured image is projected through projection conversion is viewed from a predetermined viewpoint located obliquely above the vehicle image, or an image obtained by three-dimensionally restoring the periphery of the vehicle, to be displayed on the display portion as the display image.

3. The vehicle periphery display device according to claim 2, wherein,
in a case where the vehicle is turned, the display processing portion moves the predetermined viewpoint to a viewpoint shifted toward an opposite side to a turning direction of the vehicle with respect to a reference viewpoint, the reference viewpoint being located behind the vehicle image and at a center of the vehicle image in a vehicle width direction of the vehicle image.

4. The vehicle periphery display device according to claim 3, wherein,
in a case where the vehicle is turned, when the predicted course guide line whose position has not been changed is left in the display image, the display processing portion moves the predetermined viewpoint to a viewpoint at which the predicted course guide line whose position has been changed is displayed outside the predicted course guide line whose position has not been changed.

5. The vehicle periphery display device according to claim 3, wherein,
in a case where an object present around the vehicle is detected by an obstacle sensor, the display processing portion moves the predetermined viewpoint.

6. The vehicle periphery display device according to claim 1, wherein
the display processing portion draws at least one of the contour guide line and the predicted course guide line in the display image such that the contour guide line and the predicted course guide line are present on the road surface in a case where the vehicle advances straight, and draws at least one of the contour guide line and the predicted course guide line in the display image such that the contour guide line and the predicted course guide line are present above the road surface by a predetermined height in a case where the vehicle is turned.

7. The vehicle periphery display device according to claim 6, wherein
the predetermined height is a height corresponding to a height of an end of the vehicle in an advancing direction of the vehicle or a height of an object present around the vehicle.

8. The vehicle periphery display device according to claim 1, wherein,
in a case where a steering angle of the vehicle is equal to or more than a predetermined steering angle, the display processing portion determines that the vehicle is turned, and changes the position of at least one of the contour guide line and the predicted course guide line.

9. The vehicle periphery display device according to claim 1, wherein,
in a case where the vehicle is turned, the display processing portion gradually changes the position of at least one of the contour guide line and the predicted course guide line.

10. The vehicle periphery display device according to claim 1, wherein,
in a case where the vehicle is turned, the display processing portion leaves at least one of the contour guide line and the predicted course guide line whose position has not been changed in the display image.

11. The vehicle periphery display device according to claim 10, wherein
the display processing portion makes a display mode of at least one of the contour guide line and the predicted course guide line whose position has not been changed different from a display mode of at least one of the contour guide line and the predicted course guide line whose position has been changed.

12. The vehicle periphery display device according to claim 1, wherein,
in a case where an object present around the vehicle is detected by an obstacle sensor, the display processing portion changes the position of at least one of the contour guide line and the predicted course guide line.

13. The vehicle periphery display device according to claim 1, wherein
the display processing portion changes a display mode of at least one of the contour guide line and the predicted course guide line according to whether or not an object present around the vehicle is detected by an obstacle sensor.

* * * * *